US007025060B1

(12) United States Patent
Nicholson

(10) Patent No.: US 7,025,060 B1
(45) Date of Patent: Apr. 11, 2006

(54) PERSONAL BREATHING FILTER

(76) Inventor: Alexander J. G. Nicholson, 6108 Village Dr., Concord, NC (US) 28027

( * ) Notice: Subject to any disclaimer, the term of this patent is extended or adjusted under 35 U.S.C. 154(b) by 0 days.

(21) Appl. No.: 11/044,247

(22) Filed: Jan. 27, 2005

(51) Int. Cl.
*A62B 18/08* (2006.01)
*A62B 18/10* (2006.01)
*A61C 5/14* (2006.01)

(52) U.S. Cl. ........................... 128/206.29; 128/207.12; 128/206.17; 128/859

(58) Field of Classification Search ................ 128/848, 128/859, 860, 861, 201.13, 201.17, 201.25, 128/205.25, 205.27, 205.28, 205.29, 206.15, 128/206.16, 206.17, 206.29, 207.12
See application file for complete search history.

(56) References Cited

U.S. PATENT DOCUMENTS 703,948 A * 7/1902 Muntz ................... 128/201.25
1,929,343 A * 10/1933 Belloni .................. 128/201.25
2,610,624 A * 9/1952 Haller et al. ........... 128/205.29
3,548,823 A 12/1970 Bogacik
3,773,043 A 11/1973 Wachter
4,036,224 A 7/1977 Choporis et al.
4,614,186 A * 9/1986 John ..................... 128/201.25
5,086,768 A 2/1992 Niemeyer
D325,780 S * 4/1992 Policappelli ............... D24/164
5,386,825 A 2/1995 Bates
5,771,885 A 6/1998 Putrello
6,550,479 B1 4/2003 Duxbury

* cited by examiner

*Primary Examiner*—Teena Mitchell
(74) *Attorney, Agent, or Firm*—Dougherty / Clements

(57) ABSTRACT

A personal air filtration device has a cylindrical exhalation tube, with a one-way valve thereon. Concentric around the periphery of the exhalation tube and integrally connected to the exhalation tube rearward (proximate the user's mouth) of the one-way valve is a filter media housing. Filter media is contained between the housing and the tube. A plurality of perforations in the exhalation tube, rearward of the one way valve but forward from the housing connection ring, provide inhaled air ingress to the exhalation tube. Inhaled air forces the one-way valve closed, so that air is directed through the filter media, passes through the perforations and into the exhalation tube where the user can take in the cleansed air. The pressure of the exhaled air through the exhalation tube causes the one-way valve to open, so that exertion by the user is minimized.

16 Claims, 2 Drawing Sheets

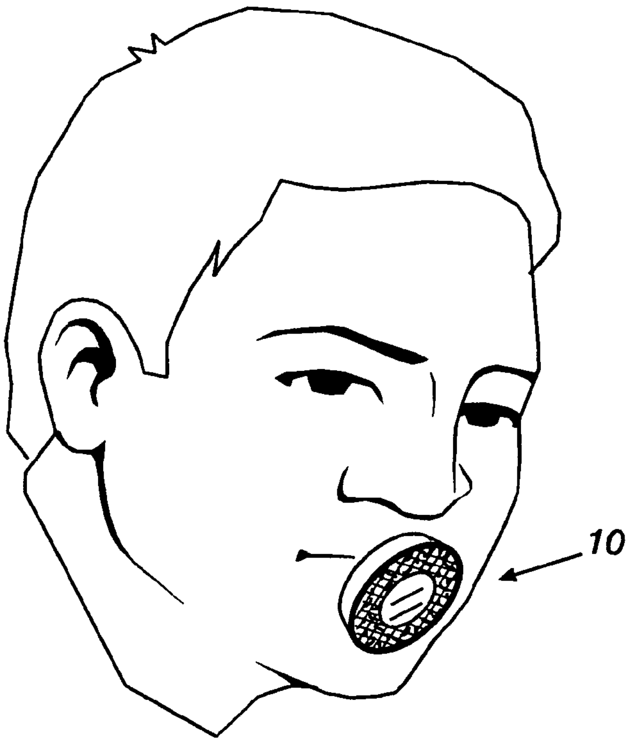
Fig.1
Fig.2
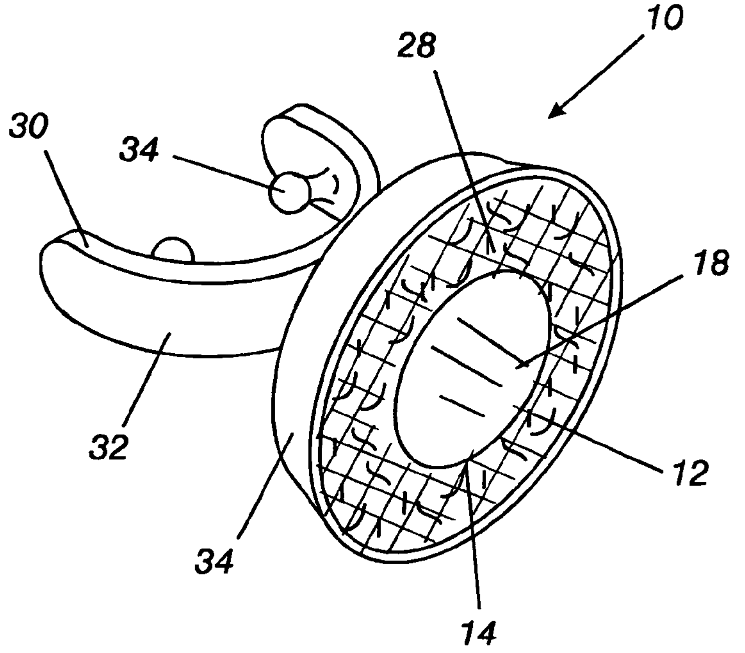

PERSONAL BREATHING FILTER

FIELD OF THE INVENTION

The present invention relates generally to a personal breathing filter and, more specifically, to a personal breathing filter retained in the mouth by the user's lips or teeth, and is totally disposable.

BACKGROUND OF THE INVENTION

Respiratory protective devices have been in use in workplace and emergency type settings for many years. While these devices are very effective for those professionals that wear them, their bulky design and high expense can be a deterrent to the private individual. Furthermore, workers may forego the use of mask type respirators for periods of short term exposure where the time involved in retrieving, fitting, and replacing the respirator is thought to outweigh the potential harm to the employee. Unfortunately, the uninformed worker can experience lasting detrimental effects to his health from even short-term exposure to certain airborne contaminants.

Furthermore, the threat of airborne contaminants to those who do not regularly encounter such particles, including chemical, inorganic, and biological contaminants, is becoming more common. With city overcrowding and ever decreasing living spaces, contact with other people is a fact of daily life. Many individuals are likely to have close contact with sick persons on a daily basis. In the event of an emergency, an individual may not have time to retrieve a large mask type respirator from storage that could effectively filter inhaled air. Further, a person may find himself in a situation where access to a mask type respirator is impossible. By the time such person is able to retreat from the infected area, he may have already inhaled harmful contaminants.

While several personal respirators have been described in the prior art, each has various drawbacks and flaws that make them unsuitable for portable, individual use. Typically these personal respiratory filters provide inadequate airflow, thus requiring strenuous physical exertion by the user due to either or both of the airflow resistance through the filter media, and large dead space volume. Upon exhalation, not all air is forced from the filter. The filter volume occupied by this exhaled air, which is relatively high in carbon dioxide and other waste gasses, is the dead space. The dead space gasses are reinhaled prior to inhaling the relatively oxygen rich "new" air. If the dead space is too large, or the flow resistance is too great, extra exertion by the user can easily cause hyperventilation and unconsciousness, thus prolonging exposure to the airborne contaminants.

Despite the amount of prior art, there remains a need for an easily portable, inexpensive and wholly disposable personal breathing filter that can effectively remove both organic and inorganic particles from inhaled air, while not requiring increased effort by the user to maintain normal breathing.

DESCRIPTION OF THE PRIOR ART

U.S. Pat. No. 5,771,885 issued to Putrello discloses an exercise filter assembly with removable filters and two one-way valves. The one-way valves direct inhaled air through the filter media, and exhaled air through an exhaust port. A first filter of activated carbon, and a second filter of glass fiber are removably provided to filter contaminants from the air. The replaceable filters are provided with airtight seals to prevent ingress of unfiltered air. The filter housing itself is too substantial to be easily portable or disposable.

U.S. Pat. No. 5,389,825 issued to Bates discloses a respiratory breathing filter apparatus that conforms with the user's mouth, and is engaged by the teeth without use of the user's hands. Similar to the Putrello filter, it comprises a plurality of one-way valves, and two filter media for removing course and fine particles respectively. The housing is designed to administer a medicament to the inhaled air. Again, the filter is too substantial for easy portability and disposability.

U.S. Pat. No. 3,773,043 issued to Wachter discloses a respirator having an annular interior wall in which a filter is mounted. The filter is arranged so that airflow is across its major dimension and cross-section through a relatively shallow depth filter. Such an arrangement provides little flow resistance to incoming air.

U.S. Pat. No. 3,548,823 issued to Bogacik discloses a personal respirator device having a mouthpiece with an attachable filtration bag. Both inhaled and exhaled air pass through the filtration media, such that the device has a large dead space of exhaled air, as well as substantial resistance to airflow.

SUMMARY OF THE INVENTION

The invention is a personal air filtration device that is small enough to be easily carried in a user's purse, pant pocket, or the like. The device is preferably made from an inexpensive plastic material so as to be wholly disposable after only a few uses. The filtration apparatus is a cylindrical exhalation tube, with a one-way valve therein. The one-way valve provides easy escape for exhaled air, while preventing ingress of air through the valve. Concentric around the periphery of the exhalation tube is a filter media housing, containing a filter media. The filter media housing is integrally connected to the exhalation tube rearward (proximate the user's mouth) of the one-way valve. A plurality of perforations in the exhalation tube, rearward of the one way valve but forward from the housing connection ring, provide inhaled air ingress to the exhalation tube. Inhaled air forces the one-way valve closed, whereby air is directed through the filter media, passes through the perforations and into the exhalation tube from which the user can take in the cleansed air. The pressure of the exhaled air through the exhalation tube causes the one-way valve to open, so that exertion by the user is minimized.

BRIEF DESCRIPTION OF THE DRAWINGS

The foregoing and other objects of the invention will become more readily apparent by referring to the following detailed description and the appended drawings in which:

FIG. 1 is a perspective view of the invented personal air filter in use.

FIG. 2 is a perspective view of the personal air filter of FIG. 1.

DETAILED DESCRIPTION OF A PREFERRED EMBODIMENT

Figure 3:
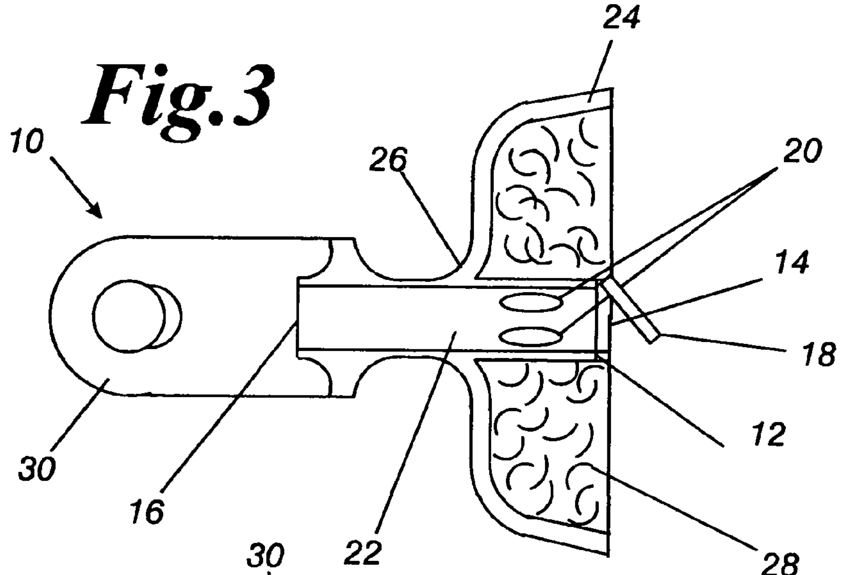
FIG. 3 is a cross-sectional view of the personal air filter of FIG. 1.

Referring now to the figures, and particularly to FIG. 1, the invented personal air filter 10 is illustrated. The air filter 10 is wholly retained in the mouth of the user by only a biting action of the teeth or lips. This leaves the hands of the user free to engage other objects that would necessarily have to be manipulated in order for the user to go about his daily routine, or escape from a contaminated area. The personal air filter 10 is small enough that it is easily portable, being carried and concealed on the user. The small size of the filter 10 makes it ideal for use in storage bins or other bulk containers, where employees or other individuals would have ready access to the filter 10 before entering a contaminated environment. The filter is advantageously made from polyester, polyethers, nylons, or other plastics, with the preferred material being polyethylene terephthalate.

In its simplest form, the air filter 10 is comprised of an exhaust tube 12 having a forward 14 and a rearward end 16. A one-way valve 18 is located within the exhaust tube 12 proximate the forward end 14. A plurality of vent holes 20 are located rearward of the one-way valve 18, but forward from a midpoint 22 of the exhaust tube 12. A frustoconical filter housing 24 concentric with the exhaust tube 12 is attached around the exhaust tube 12 around a perimeter located between the forward 14 and rearward ends 16. The concentric filter housing 24 extends from the exhaust tube 12 in a roughly frustoconical or frustospherical shape towards the forward end 14 of the exhaust tube 12, such that the vent holes 20 provide passage from the interior of the exhaust tube 12 to the space between the filter housing's 24 interior wall and the exhaust tube's exterior wall.

The exhaust tube 12 provides both ingress for inhaled air, and egress for exhaled air. While it is shown as being cylindrical, or substantially cylindrical, the cross-sectional shape of the tube is not essential to its function. The exhaust tube 12 is provided with a forward end 14 that is open to the environment, and a rearward end 16, which is inserted into the user's mouth. An attachment location 26 is provided for purposes of a clear description. The attachment location 26 is shown as proximate to a midpoint 22 along the length of the exhaust tube 12. However, location 26 can be provided at any convenient point along the length of the tube 12.

Located circumferentially between the attachment point and the forward end 14 is a plurality of vent holes 20. The vent holes 20 are perforations in the exhaust tube 12 extending through the sidewalls thereof that permit air to flow from one side thereof to the other. The vent holes 20 can have dimension or shape, but are so formed as to provide minimal resistance to airflow through the vents 20. Depending on the type of filter material that is utilized, and the environment in which the filter is used, the vents 20 are sized and dimensioned accordingly.

A one-way valve 18 is located forward from the vent holes, but rearward of the forward end 14. The one-way valve 18 is configured so that air can flow from the rearward end 16 of the exhaust tube 12, through the valve 18, and exit the exhaust tube 12 through the forward end 14. When air is not flowing through the exhaust tube 12, the valve 18 provides an airtight barrier that prevents contaminants from being inhaled through the forward end 14 of the exhaust tube 12, and into the user's respiratory system. The valve 18 can be of a butterfly, flap, ball bearing/spring type or any other available type valve 18. The valve 18 can be located within the exhaust tube 12, wherein it seats against an internal annular ring to provide airtight sealing. Alternatively, the valve 18 can be located as a cap to the forward end 14, so that the forward edge of the exhaust tube 12 provides the sealing ring.

A filter housing 24 is attached to the outer surface of the exhaust tube 12 at its attachment point. The filter housing 24 is preferably frustoconical or frustocylindrical in shape, extending outward and forwardly from the attachment point toward the forward end 14 of the exhaust tube 12. While a frustoconical or frustocylindrical shape is disclosed, the shape of the filter housing 24 is not so limited, and can take many other shapes depending on the shape of the exhaust tube 12, and the environment in which the filter 10 will be used. It is preferable that the forward end 14 of the filter 10 is coplanar with the forward end 14 of the exhaust tube 12. This provides a consistent symmetrical recess in which the filter material is held. Positioning the filter housing 24 in this arrangement creates a void between the outer wall of the exhaust tube 12 and the inner wall of the filter housing 24. Airflow from the void to the exhaust tube 12 interior is possible through the vent holes 20.

A filtration media 28 is held within the void between the outer wall of the outer wall of the exhaust tube 12 and the inner wall of the filter housing 24. The filtration media 28 is selected for the anticipated application and environment in which the filter 10 will be utilized. Examples of filtration media 28 include glass wool, cotton, activated carbon mesh, and the like. Additionally, the filtration media 28 can be treated with an antimicrobial, antibacterial, or biocidal agent to increase the effectiveness of filtering organic material from the air. The filtration media 28 is dense enough to effectively filter inhaled air, but not so dense that resistance to airflow is greatly increased. The filter media 28 can be used with or without a screen to prevent it from dislodging from the void. While some filter media 28 can be retained within the void without application of a screen, a screen may indeed be required with other filtration media 28. Such a screen can be applied over the vent holes to prevent introduction of filter media 28 into the exhaust tube 12, or it can be applied radially to connect the exhaust tube's forward end 14 to the terminal end of the filter housing 24.

A mouthpiece 30 may be attached to the rearward end 16 of the exhaust tube 12, to facilitate holding of the air filter 10 within the mouth of the user. The mouthpiece 30 may be made of the same material as the filter 10, or alternatively, can be of a different, preferably softer, material so that it is more comfortable inside the user's mouth. Suitable mouthpiece materials include silicone, neoprene, or other softer rubbers, polymers, or polymer composites. The mouthpiece 30 as shown has a similar shape to a mouthpiece of an underwater snorkel or other breathing device that are comfortably inserted into the mouth. A curvilinear shield 32 can be provided that is held between the gums and the lips of the user. The shield 32 is preferably sized to completely cover the interior of the lips so that the user does not have to maintain a tight seal around the mouthpiece 30 with their lips. Extending rearward from the shield 32 can be a pair of teeth clamps 34, which provide a surface on which the user can bite the mouthpiece 30, thereby retaining the mouthpiece 30 within the user's mouth.

Figure 4:
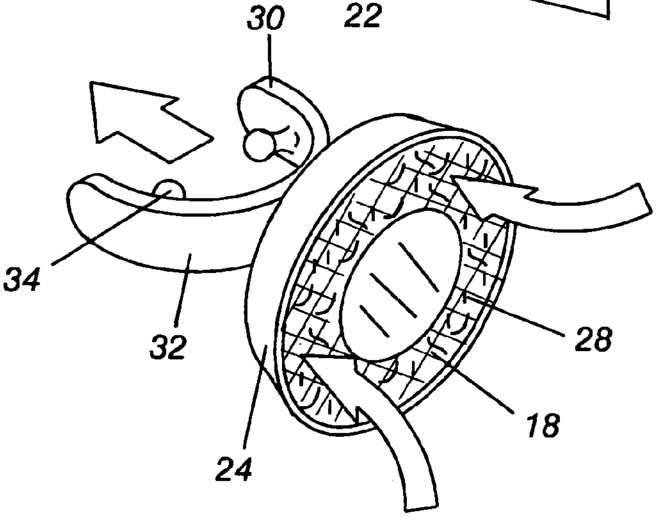
FIG. 4 is the personal air filter of FIG. 1 illustrating the flow of inhaled air through the filter.

Referring now to FIG. 4 which shows a schematic airflow diagram, upon inhalation, negative pressure in the exhaust tube 12 forces the one-way valve 18 closed, forming an airtight seal so that contaminated air cannot enter the exhaust tube 12 through the valve 18. Contaminated air is thus drawn in through the filtration media 28, where it is filtered of contaminants. The cleansed air then passes from the filter media 28, through the vents, into the exhaust tube 12, and then into the user's respiratory system.

Figure 5:
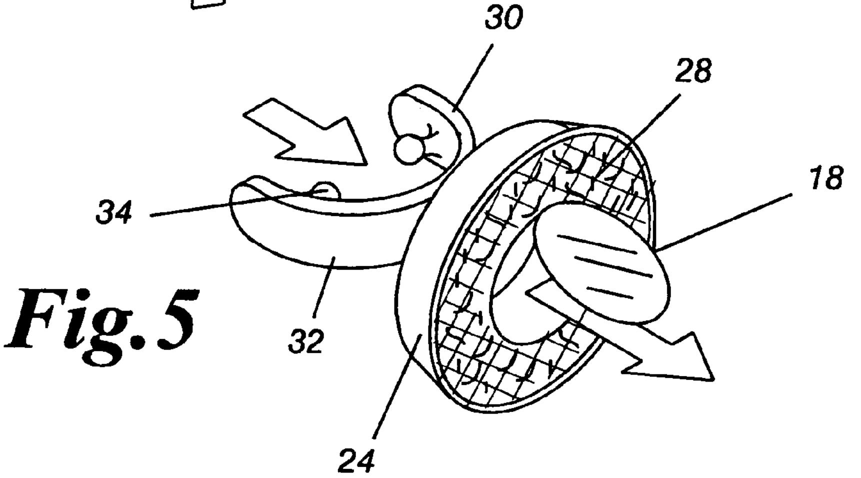
FIG. 5 is personal air filter of FIG. 1 illustrating the flow of exhaled air through the filter.

As shown in FIG. 5, exhaled air exits the user's respiratory system, and flows into the exhaust tube 12. Positive pressure builds in the exhaust tube 12 until the one-way valve 18 is forced open. Exhaled air then escapes from the exhaust tube 12. The amount of pressure required to open the valve 18 is only slightly greater that the ambient pressure in the tube 12. The pressure required to open the valve 18 is less than that which would force the exhaled air back through the filter media 28.

The concentric arrangement of the filter media 28 with the exhaust tube 12 is beneficial to the filtration device in that it provides the least amount of resistance to flow, and thus minimizes any additional exertion by the user. The exhaust tube 12 extends linearly out from the user's mouth, thus providing laminar flow of the exhaled air. The filter media 28 is arranged concentrically about the exhalation tube 12 to provide the largest possible area from which to draw inhaled air, while minimizing the size of the filter 10. The invented filter 10 exhibits less flow resistance, has less dead space, and thus requires less exertion by the user than other filters presently available.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

I claim:

1. A personal breathing filter retained solely by the mouth of a user without need for additional support, said filter comprising:

an exhaust tube comprising a forward end, a rearward end for insertion into the mouth of said user, and at least one vent located between said forward end and said rearward end;

a filter housing integrally attached about the circumference of said exhaust tube at an attachment point between said vent and said rearward end, said filter housing extending concentrically with said exhaust tube and toward the forward end of said tube, thereby defining a void;

a filter media retained within said void; and a one-way valve located between said vent and said forward end, said valve being positioned so that airflow is directed outward from said forward end;

said one-way valve being sealed during inhalation to direct inhaled air through said filter media and vents, and said one-way valve being open during exhalation to direct exhaled air outward through said one-way valve.

2. The personal breathing filter of claim 1, wherein said filter housing is frustoconical or frustocylindrical in shape.

3. The personal breathing filter of claim 1, wherein said at least one vent further comprises a plurality of vents.

4. The personal breathing filter of claim 3, wherein said plurality of vents are arranged circumferentially about said exhaust tube.

5. The personal breathing filter of claim 1, further comprising an annular ring against which said one-way valve is seated, so as to provide an airtight seal.

6. The personal breathing filter of claim 1, further comprising a mouthpiece attached to said rearward end to facilitate holding said filter within the user's mouth.

7. The personal breathing filter of claim 6, wherein said mouthpiece comprises a mouth shield adapted to fit between the teeth and the gums of the user.

8. The personal breathing filter of claim 7, wherein said mouthpiece further comprises at least one teeth clamp, to facilitate retention of said filter within said user's mouth.

9. The personal breathing filter of claim 7, wherein said mouthpiece is curvilinear.

10. The personal breathing filter of claim 6, wherein said mouthpiece is made of a different material than said exhaust tube.

11. The personal breathing filter of claim 6, wherein said mouthpiece is integrally attached to said rearward end of said exhaust tube.

12. The personal breathing filter of claim 6, wherein said mouthpiece is made from a material selected from the group consisting of silicone, neoprene, and combinations thereof.

13. The personal breathing filter of claim 1, wherein said filter media is selected from the group consisting of glass wool, cotton, activated carbon mesh, and combinations thereof.

14. The personal breathing filter of claim 1, wherein said filter media is treated with at least one antimicrobial agent, antibacterial agent, biocidal agent, or combinations thereof.

15. The personal breathing filter of claim 1, wherein said personal breathing filter is made from a material selected from the group consisting of polyester, polyethers, and nylons.

16. The personal breathing filter of claim 1, wherein said one-way valve is selected from the group consisting of butterfly valves, flap valves, and ball bearing/spring type valves.

* * * * *